United States Patent [19]
Foerster et al.

[11] Patent Number: 6,149,973
[45] Date of Patent: Nov. 21, 2000

[54] PROCESS FOR THE COATING OF THE FLOW CHANNELS OF A HONEYCOMB FORM CATALYTIC CONVERTER CARRIER WITH A DISPERSION COATING

[75] Inventors: Martin Foerster, Büdingen; Ewald Dittrich, Grosskrotzenburg; Gerhard Birtigh, Nidderau; Walter Leibold, Steinau; Bernd Mergner, Rheinfelden, all of Germany; Michael Hoffmann, Rochester, Mich.; Wolfgang Hasselmann, Port Elizabeth, South Africa; Robert Schäfer, Grenzach, Germany

[73] Assignee: Degussa-Hüls Aktiengesellschaft, Frankfurt, Germany

[21] Appl. No.: 09/146,436

[22] Filed: Sep. 3, 1998

[30] Foreign Application Priority Data

Mar. 10, 1998 [DE] Germany .......................... 198 10 260

[51] Int. Cl.[7] ..................................................... B05D 7/22
[52] U.S. Cl. .......................... 427/235; 427/238; 427/243; 427/294; 427/443.2
[58] Field of Search ................................... 427/230, 235, 427/238, 243, 443.2, 294; 502/439

[56] References Cited

U.S. PATENT DOCUMENTS

| | | |
|---|---|---|
| 4,066,801 | 1/1978 | Hoyer ........................................... 427/8 |
| 4,208,454 | 6/1980 | Reed et al. . |
| 5,182,140 | 1/1993 | Watanabe et al. . |
| 5,298,292 | 3/1994 | Dilko et al. . |
| 5,346,722 | 9/1994 | Beauseigneur et al. ................. 427/300 |

FOREIGN PATENT DOCUMENTS

| | | |
|---|---|---|
| 0157651 | 10/1985 | European Pat. Off. . |
| 0327880 | 8/1989 | European Pat. Off. . |
| 0444494 | 9/1991 | European Pat. Off. . |
| 4040150C2 | 2/1992 | Germany . |
| 1515733 | 6/1978 | United Kingdom . |
| 97/48500 | 12/1997 | WIPO . |

Primary Examiner—Fred J. Parker
Attorney, Agent, or Firm—Smith, Gambrell & Russell, LLP

[57] ABSTRACT

A process for the coating of the flow channels of a cylindrical, honeycomb form catalyst carrier with a dispersion coating through filling of the vertically oriented flow channels with a fill quantity of the coating dispersion through the bottom face of the catalyst carrier and subsequent downward emptying and clearance extraction of the flow channels, as well as drying and calcination of the catalyst carrier, by the following steps:

a) filling of the flow channels with a fill quantity that is about 10% greater than the empty volume of the flow channels, so that the coating dispersion goes over the upper face of the catalyst carrier after completion of the filling cycle, b) removal of the excess coating dispersion at the top before emptying of the flow channels and c) emptying and clearance extraction of the flow channels through an extraction impulse, which is generated by connection of a vacuum tank with the bottom face of the catalyst carrier, whereby the time between the beginning of the fill cycle and the end of the emptying and clearance extraction amounts to no more than 5 seconds.

9 Claims, 1 Drawing Sheet

PROCESS FOR THE COATING OF THE FLOW CHANNELS OF A HONEYCOMB FORM CATALYTIC CONVERTER CARRIER WITH A DISPERSION COATING

INTRODUCTION AND BACKGROUND

The present invention relates to a process for the coating of the flow channels of a honeycomb form catalyst carrier with a dispersion coating.

Catalytic converter carriers in honeycomb form are in large measure used for the creation of automobile exhaust catalytic converters. They have a cylindrical shape, and are filled with a multitude of flow channels parallel to the axis of the cylinder for the exhaust of internal combustion engines. The cross-sectional shape of the catalyst carrier depends on the requirements of the vehicle design. In wide use are catalytic converters with round, elliptical or triangular shaped cross-sections. The flow channels mostly have a square cross-section and are arranged in a tight grid over the entire cross-section of the catalytic converter. According to the particular application scenario, the cell density of the flow channels varies between 10 and 120 $cm^{-2}$. Honeycomb carriers with cell densities up to 250 $cm^{-2}$ and more are being developed.

Predominantly used for the purification of auto exhaust gas are catalyst carriers that are obtained through extrusion of ceramic masses. Alternatively, catalyst carriers made out of corrugated and wound up metal foils are available. Ceramic catalyst carriers with cell densities of 62 $cm^{-2}$ are still predominantly used today for the exhaust purification of passenger vehicles. The cross-sectional dimensions of the flow channels in this case amount to 1.27×1.27 $mm^{-2}$. The wall thicknesses of these catalyst carriers lie between 0.1 and 0.2 mm.

For the most part, finely distributed platinum group metals, which can be changed in their catalytic effect through compounds of base metals, are used for the conversion of pollutants contained in automobile exhaust—such as carbon monoxide, hydrocarbons, and nitrogen oxide—into innocuous compounds. These catalytically active components must be deposited on the catalyst carriers. However, it is not possible to guarantee the required fine distribution of the catalytically active components through deposition of these components on the geometric surfaces of the catalyst carriers. This applies in the same way to non-porous metallic catalyst carriers as well as porous ceramic ones. A sufficiently large surface area for the catalytically active components can only be made available through application of a support coating of fine particulate, high surface area materials.

Thus the present invention relates to a process for the application of such a support coating on the inner surface of the flow channels of honeycomb form catalyst carriers. Within the framework of this invention, the support coating for the catalytically active components is designated as a dispersion coating. The dispersion coating consists of fine particulate high surface area materials and is produced under application of a so-called coating dispersion. The coating dispersion for the most part involves a slurry of the fine particulate materials in water.

Various processes for the deposition of the dispersion coating on the catalyst carrier under application of the coating dispersion are known from the state of the art. After the coating process, the catalyst carriers are dried and then calcined for the strengthening of the dispersion coating. Then the catalytically active components are introduced into the dispersion coating through impregnation with mostly aqueous solutions of precursor compounds of the catalytically active components. Alternatively, the catalytically active components can be added to the coating dispersion itself. In this case, an additional impregnation of the prepared dispersion coating with the catalytically active components is no longer necessary.

For effective purification of the exhaust gases of internal combustion engines, the volume of the catalyst carriers must have a sufficient dimension. Usually a ratio of the engine cylinder displacement to the volume of the catalyst carrier of 1:2 to 2:1 is chosen. Thus catalyst carrier typical for automobiles have a volume of about 1 liter with a diameter of 100 mm (4 inches) and a length of 152 mm (6 inches). The dry weight of the dispersion coating on such catalyst carriers is from 50 to 200 g/l volume of the catalyst carrier. With a cell density of 62 $cm^{-2}$, this corresponds to a calculated coating thickness of the dispersion coating of 20 to 80 $\mu$m. Because of the capillary forces, the dispersion coating as a rule is nevertheless very unevenly distributed over the cross section of the flow channels, with strong accumulations of coating material in the corners of the channels and relatively thin coating thicknesses on the centers of the channel walls.

Processes for the application of the dispersion coating on the catalyst carriers must have a high productivity with low amounts of rejects. They must therefore make it possible to apply the entire quantity of coating on the catalyst carrier in a single operational cycle. Multiple coatings to attain the required coating thickness should be avoided. Moreover, the coating processes must assure that the coating material does not clog the flow channels. Furthermore it is generally required from such coating processes that they avoid coating the outer covering of the catalyst carrier. In so doing, expensive coating material and potentially expensive catalytically active components can be saved.

GB 1 515 733 describes a coating process for ceramic catalyst carriers. The porous catalyst carriers are inserted upright, that is, with vertically oriented flow channels, in a pressure tight coating tank and degassed through application of a partial vacuum of 0.84 bar (25 inch mercury column). Next the coating dispersion is poured over the upper face of the catalyst carrier into the coating tank and pressed into the pores of the catalyst carrier through application of overpressure. After withdrawal of the overpressure and opening of a release valve in the base of the coating tank, the excess coating dispersion flows out of the flow channels of the catalyst carrier. Finally, any channels blocked by coating dispersion are blown open with compressed air blown from top to bottom. The cycle time of this coating process amounts to less than 1½ to 2 minutes.

U.S. Pat. No. 4,208,454 likewise describes a process for the coating of porous ceramic catalyst carriers. The catalyst carriers to be coated are placed with their lower face on the opening of a collection tank in which the pressure is reduced by means of a high volume blower by 5 to 16 inches of water column in relation to the atmospheric pressure. This partial vacuum is held constant during the entire coating time. A predetermined volume of the coating dispersion is distributed over the upper face of the catalyst carrier and steadily run through the flow channels into the collection tank. The suction cycle is maintained for about 30 seconds. After the first 5 seconds, the entire quantity of coating is run through the catalyst carrier. During the remaining time, the air flowing through the flow channels ensures that any flow channels blocked by coating dispersion are opened. The quantity of coating remaining on the catalyst carrier can be influenced by the duration of the overall suction time and by the level of the partial vacuum. The axial uniformity of the coating on the catalyst carrier can be improved by turning the catalyst carrier after about half of the suction time and then suctioning in the opposite direction. With this process, coating dispersions with 30 to 45% solids content as well as a viscosity of from 60 to 3000 cps can be processed. The preferred solids content lies at 37% by weight and the preferred viscosity at 400 cps. The reproducibility of the quantity of coating is given at +/−5% in this process.

EP 0157 651 likewise describes a process for the coating of ceramic catalyst carriers with a predetermined quantity of a coating dispersion. To accomplish this, the pre-weighed quantity of the coating dispersion is poured into an open wide tank and the catalyst carrier with its bottom face dipped in the dispersion. Then the dispersion is sucked into the flow channels through application of a light partial vacuum. In order to improve the axial uniformity of the coating, it is recommended here also to have the coating process proceed in two steps.

In the first step, only about 50 to 85% of the entire quantity of coating is poured into the tank and sucked into the catalyst carrier. Afterwards, the catalyst carrier is turned and the remaining quantity of coating is suctioned in the opposite direction. This coating process requires no separate step for the opening of any closed flow channels. The cycle time of this process amounts to less than 1 minute. With this process, coating dispersions that have a solids content of between 35 and 52% and a viscosity of between 15 and 300 cps can be processed.

U.S. Pat. No. 5,182,140 describes a process for the coating of ceramic and metallic catalyst carriers. In this process, the coating dispersion is pumped from underneath into the vertically placed catalyst carrier until the dispersion reacher a level completely above the upper face of the catalyst carrier. Then the coating dispersion is removed from the substrate through application of compressed air on the upper face of the catalyst carrier. In this way, any flow channels that are still closed are blown open. According to Example 1 of this patent document, a level of the coating dispersion of 2 cm over the upper face of the catalyst carrier is used. The compressed air for the expulsion of the coating dispersion from the flow channels is introduced in two successive stages of pressure. During the first 2 seconds after filling the catalyst carrier, the coating dispersion is acted upon with compressed air of 3.7 bar. This high pressure is sufficient to expel the coating dispersion completely from the flow channels during the available 2 seconds. Afterwards, the compressed air pressure is reduced to 0.37 bar and the catalyst carrier acted upon twice with this pressure for 0.5 seconds each time. With this process, coating dispersions that have a specific density between 1 and 2 g/ml and a viscosity of between 100 and 500 cps can be processed.

DE 40 40 150 C2 likewise describes a process for the even coating of a honeycomb carrier made out of ceramic or metal. For this process, the honeycomb carrier is submerged in a dipping barrel and filled with the coating dispersion from below. Afterwards, the honeycomb carrier is emptied again through blowing or suction. The honeycomb carrier is then removed from the dipping barrel and cleared with suction or blowing in a separate system in order to avoid blocked flow channels. With this process, coating dispersions with solids content of between 48 and 64% and viscosities from 50 to more than 100 cps can be processed.

Exhaust catalytic converters for internal combustion engines are subject to continually increasing statutory requirements in relation to their conversion of pollutants and service life. An increase of the service life of the catalytic converters can be achieved through an improved catalyst recipe as well as through an increase of the amount of the catalytically active components on the catalyst. However, a higher quantity of catalytically active components also requires a higher loading of the catalyst carrier with coating dispersion. Improved conversion of pollutants can also be achieved through catalyst carriers with higher cell densities. In both cases—with the increase of the coating concentration as well as with the increase of the cell density—the danger in the coating process of clogging of the flow channels with coating dispersion increases.

It is therefore an object of the present invention to make available a new coating process for ceramic and metallic catalyst carriers in honeycomb form that distinguishes itself by the following characteristics:

reproducible loading of the catalyst carrier of a production lot always with the same quantity of coating dispersion coating of the catalyst carrier with more than 200 g of dry mass per liter of catalyst carrier volume coating of catalyst carriers with cell densities up to 250 $cm^{-2}$ as uniform a radial and axial thickness of the coating as possible assured prevention of clogged flow channels as great an independence of the process from the rheological characteristics of the coating dispersion as possible

SUMMARY OF THE INVENTION

The above and other objects are achieved in accordance with the present invention by a process for the coating of the flow channels of a cylindrically shaped, honeycomb form catalyst carrier with a dispersion coating through filling of the vertically oriented flow channels with a fill quantity of the coating dispersion through the bottom face of the catalyst carrier and subsequent downward emptying and clearance extraction of the flow channels as well as drying and calcination of the catalyst carrier. The process is characterized by the following steps:

a) Filling of the flow channels with a fill quantity that is about 10% greater than the empty volume of the flow channels, so that the coating dispersion goes over the upper face of the catalyst carrier after completion of the filling cycle, b) Removal of the excess coating dispersion at the top before emptying of the flow channels and c) Emptying and clearance extraction of the flow channels through an extraction impulse, which is generated by connection of a vacuum tank with the bottom face of the catalyst carrier, whereby, the time between the beginning of the fill cycle and the end of the emptying and clearance extraction amounts to no more than 5 seconds.

BRIEF DESCRIPTION OF DRAWINGS

The present invention will be further understood with reference to the accompanying drawing wherein.

DETAILED DESCRIPTION OF INVENTION

Figure 1:
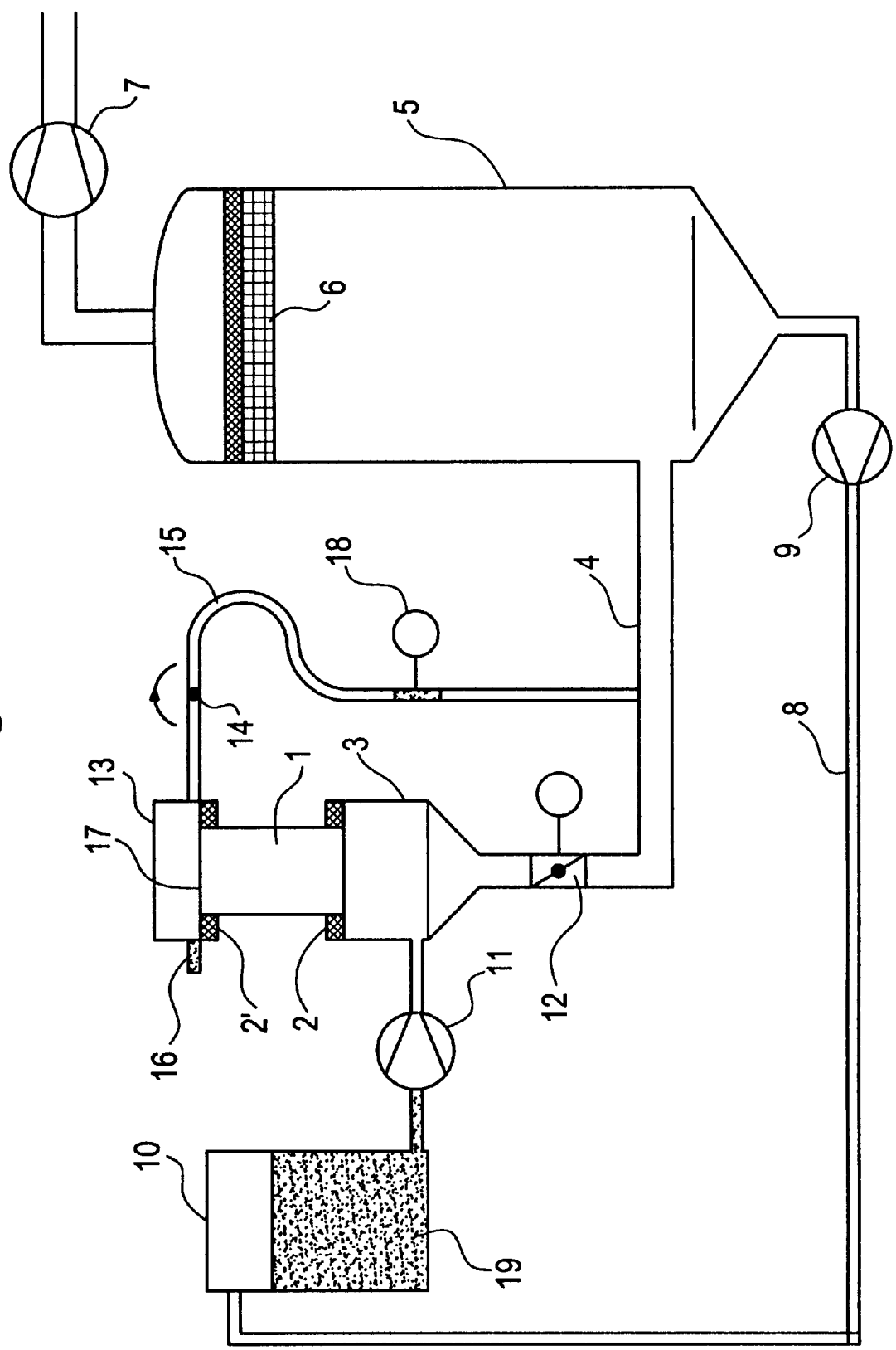
FIG. 1 is a schematic representation of the apparatus employed for carrying out the process.

Filling, emptying and clearance extraction of the flow channels of the catalytic converter are, according to the invention, executed very quickly. The flow speed of the coating dispersion into the flow channels amounts to 0.1 to 1 m/s. The filling of the coating dispersion from below proceed until the coating dispersion exits from the upper face of the catalyst carrier and submerges the upper face. In this way, it is assured that all flow channels of the catalyst carrier are filled with coating dispersion. This is the case then, if the required volume of the coating dispersion is about 10% greater than the empty volume of all flow channels of the honeycomb carrier together. Preferably, this excess coating dispersion is set at 1 to 5% of the empty volume of the flow channels. This excess should, on the one hand, be kept as minimal as possible, but, on the other hand, be sufficient to guarantee the complete filling of all flow channels. Too great an excess of the coating dispersion leads to a flushing effect in the flow channels and with it to a reduction of the quantity of coating remaining on the catalyst carrier.

The filling of the flow channels can occur in various ways. The possibility exists of pumping the coating dispersions into the catalyst carrier from below, or, sucking it into the catalyst carrier through application of a partial vacuum at its upper face. Preferably, the coating dispersion is pumped in.

The second measure—according to which the excess coating dispersion is removed from the top before emptying and clearance extraction of the flow channels—of the process according to the invention also serves for the prevention of this flushing effect. This can happen, for example, through an application of suction at the top face of the catalyst carrier from the side or from above. A neglect of the removal of the top excess coating dispersion before the emptying would have as a consequence that this top excess coating dispersion likewise has to be extracted through the flow channels. The flushing effect connected with this would reduce the quantity of coating deposited on the catalyst carrier.

Tests have shown that through the prior removal of the excess coating dispersion, the quantity of coating that can collect on the catalyst carrier can be increased by about 20 g dry mass per liter of catalytic converter volume.

The rapid emptying and secure prevention of blocked flow channels is achieved through application of an extraction impulse at the bottom face of the catalyst carrier. The short time of less than 1 second between filling and emptying leads to the situation where the flow limit of thixotropic to intrinsically viscous dispersions cannot build up. The extraction impulse is generated by means of a vacuum tank, which is connected with the bottom face of the catalyst carrier. Preferably, the vacuum tank is evacuated at a partial vacuum of at least 150 mbar. Through creation of the connection between the bottom face of the catalyst carrier and the vacuum tank, the coating dispersion is removed from the flow channels within a short time span of 1 to 1.5 seconds. The in-rushing air opens any flow channels that are still blocked, which, within the context of this invention, is characterized as clearance extraction, and leads to a reduction of the partial vacuum in the vacuum tank and thus to a continuous decrease in the flow rate of the air in the flow channels.

The emptying characteristic can be influenced by 4 parameters. Consequently, it involves the initial partial vacuum in the vacuum tank, the required power of the vacuum blower, the volume of the vacuum tank in relation to the volume of the catalyst carrier and the open flow cross section between the bottom face of the catalyst carrier and the vacuum tank.

As rapid a removal of the coating dispersion from the flow channels as possible is achieved through a partial vacuum in the vacuum tank of at least 150 mbar. Afterwards, the partial vacuum, as the driving force for the removal of the coating dispersion from the flow channels and for the subsequent air flow, should continually decrease in order to prevent too much coating material from being removed from the flow channels. This can happen through appropriate dimensioning of the volume of the vacuum tank and the blower power, and through adjustment—between 0 and a maximum value equal to the chosen conduit cross-section between catalyst carrier and vacuum tank—by means of a reducing damper, of the open flow cross-section between the catalyst carrier and the tank.

During the clearance extraction, the flow rate of the air in the flow channels is over 5 m/s. The maximum value of the flow rate at the beginning of the extraction is over 40 m/s. These flow rates can be set through corresponding regulation of the reducing damper and the blower power.

Dry ceramic catalyst carriers can produce a considerable suction capacity for the fluid phase of the coating dispersion. In the coating of high cell density catalyst carriers with cell densities of 120 $cm^{-2}$ and over, this already leads to a solidification of the coating dispersion, and in turn to a clogging of the flow channels during the filling of the catalyst carriers. In order to be able also to coat these catalyst carriers as per the described process, it is provided to moisten the catalyst carriers before the coating. In this moistening, a pre-impregnation with acids, bases, or saline solutions can be used. The pre-impregnation facilitates the formation of the coating on the channel walls according to the sol-gel method. Through the contact of the coating dispersion with the pre-impregnated channel walls, the pH value of the dispersion is shifted. In this way the dispersion is converted into a gel.

The concentration of the coating dispersion on the catalyst carrier can be increased in an another advantageous embodiment of the process according to the invention by flowing preheated air through the catalyst carrier at temperatures between 20 and 150° C. and speeds of more than 4, preferably 7–10 m/s, against gravitational force for the duration of 5 to 20 seconds, after removal from the coating apparatus from below. Through this type of drying, before the actual calcination of the catalyst carriers, a tapering of the flow channels—or a narrowing of the channel on the bottom end of catalyst carriers—frequently observed with very high loading, can be avoided. This additional measure thus makes it possible to load the catalyst carrier with a higher quantity of coating than usual, without the danger existing that the flow channels taper off, or narrow, during the drying and calcination cycle.

The invention is now explained in greater detail with reference to some examples.

According to FIG. 1, the coating apparatus consists of:

the catalyst carrier 1 to be coated, a receptacle 17 for the catalyst carrier with a lower rubber collar 2 and an upper rubber collar 2', an extraction funnel 3 underneath the receptacle for the catalyst carrier, an extraction conduit 4 that connects the extraction funnel 3 to the vacuum tank 5 through the throttle flap 12, a demister 6 in the vacuum tank as well as an vacuum blower 7, which maintains a partial vacuum of about 150 to 500 mbar in the vacuum tank, a recirculation conduit 8 as well as a pump 9 for the recirculation of the excess coating dispersion, the tank 10 for the coating dispersion 19, a pump 11 for pumping the coating dispersion into the catalyst carrier, a cover cap 13 with a relief valve 16 and suction line 15 that enters into the extraction line 4, whereby the cover cap can be swung up around pivot axis 14 and a suction valve 18 in suction line 15.

With this coating apparatus, the coating of a honeycomb carrier is carried out as follows:

1. Close the throttle flap 12 and suction valve 18,
2. Load the catalyst carrier 1 in the receptacle 2,
3. Set the cover cap 13 on the upper rubber collar of the catalyst carrier, opening the relief valve 16,
4. Pump a fill quantity of the coating dispersion, which is about 10% greater than the empty volume of the flow channels (excess coating dispersion), into the catalyst carrier from below with the pump 11,
5. Open the suction valve 18 and suction off the top excess coating dispersion from the upper face into the vacuum tank 5,
6. Close the suction valve 18, open the cover and then open the throttle flap 12 to a pre-determined value for extracting the surplus coating dispersion in the catalyst carrier (clearance extraction),
7. Post extraction of air to open any flow channels that still might be clogged,
8. Remove the catalyst carrier, and in some cases flow heated air through the catalyst carrier against the emptying direction in a separate apparatus.

In the vacuum tank, the extracted coating dispersion is collected and routed back into the storage tank 10 by means of pump 9 through the return conduit 8.

With the described apparatus, the following test series were conducted:

COMPARISON EXAMPLE 1

A series of 100 ceramic honeycomb carrier were provided with a catalytic coating. All dispersions were strongly thixotropic (definition of thixotropy according to DIN 13342).

| Data of the honeycomb carriers | | |
|---|---|---|
| cell density | 62 | $cm^{-2}$ |
| wall thickness | 0.16 | mm |
| diameter | 101.6 | mm |
| length | 152.4 | mm |
| volume | 1.24 | l |
| Data of the coating dispersion | | |
| $Al_2O_3$ mixed oxide dispersion solids content | 60 | % by weight |
| viscosity | 400 | mPa.s· |
| Process parameters | | |
| fill time | 1.5 | s |
| excess coating dispersion | 8 | % |
| suction time for excess dispersion | no suction | |
| $V_{vacuum\ container}/V_{honeycomb}$ | 500 | |
| partial vacuum $p_1$ | 350 | mbar |
| throttle flap setting | 27 | % |
| emptying time (extraction time) | 0.5 | s |
| post extraction time (clearance extraction) | 1 | s |

With these coating parameters, a coating concentration of 210 g dry mass per liter of catalyst carrier with a standard deviation of $\sigma=8$ g was obtained.

EXAMPLE 1

The coating series of Comparison Example 1 was repeated. The excess quantity of coating dispersion was, however, sucked off within 1 second this time before the emptying.

The coating concentration achieved in this way amounted to 235 g of dry mass per liter of catalyst carrier with a standard deviation of $\sigma=5$ g.

EXAMPLE 2

The coating series of Example 1 was repeated with a setting for the throttle flap of 25% (25% opening of the maximum flow cross section). The channels were still blocked after the clearance extraction. Afterwards, a flow of air heated to 80° C. was conducted through the flow channels of the catalyst carrier from the bottom up at a rate of 5 m/s for the duration of 10 seconds. The channels opened and still remained open even after 10 minutes.

The coating concentration thereby achieved amounted to 263 g of dry mass per liter of catalyst carrier with a standard deviation of $\sigma=6$ g.

EXAMPLE 3

A further series of 100 honeycomb carriers were coated as per Example 1. The honeycomb carriers were moistened before the coating by dipping in ammonia water solution (pH =8.5). All other parameters were identical with those of Example 1.

The attained dry absorption of the honeycomb carriers amounted to 252 g/l with a standard deviation of $\sigma=3$ g.

EXAMPLE 4

A series of 100 high cell density ceramic honeycomb carriers were provided with a catalytic coating.

| Data of the honeycomb carriers | | |
|---|---|---|
| cell density | 120 | $cm^{-2}$ |
| wall thickness | 0.1 | mm |
| diameter | 152.2 | mm |
| length | 50.8 | mm |
| volume | .93 | l |
| Data of the coating dispersion | | |
| $Al_2O_3$ mixed oxide dispersion solids content | 50 | % by weight |
| viscosity | 300 | mPa.s |
| Process parameters | | |
| fill time | 1.0 | s |
| excess coating dispersion | 5 | % |
| suction time for excess dispersion | 1 | s |
| $V_{vacuum\ container}/V_{honeycomb}$ | 500 | |
| partial vacuum $p_1$ | 400 | mbar |
| throttle flap setting | 30 | % |
| emptying time (extraction time) | 0.5 | s |
| post extraction time (clearance extraction) | 3 | s |

With these coating parameters, a coating concentration of 315 g of dry mass per liter of catalyst carrier with a standard deviation of $\sigma=10$ g was obtained.

As the preceding examples show, through the measures according to the invention, specifically removal of the top excess coating dispersion before emptying of the honeycomb carriers and circulation of heated air through them against the direction of emptying, the achievable coating concentrations can be increased considerably. Thus, through removal of the top excess coating dispersion, the increase of the coating concentration in Example 1 amounts to +12% in relation to Comparison Example 1. A further increase of the coating concentration of +12% (+25% in relation to Comparison Example 1) was achieved through reduction of the open flow cross-section in clearance extraction of, and subsequent circulation carriers.

The reproducibility of the coating can be improved considerably through impregnation of the honeycomb carriers with ammonia water solution.

The present results were obtained with the apparatus and FIG. 1. The process can, nevertheless, be carried out with differently configured apparatuses, as long as the described procedural steps are followed.

Further variations and modifications of the foregoing will be apparent to those skilled in the art and are intended to be encompassed by the claims appended hereto.

We claim:

1. A process for coating a cylindrical, monolithic honeycomb-form catalyst carrier with a coating dispersion, said carrier having axially aligned flow channels arranged in a grid over its cross sectional area, said carrier having an upper and a bottom face, and said process comprising the steps of:
   a) bringing said carrier in an upright position so as to orient the flow channels vertically;
   b) filling said flow channels through the bottom face with a volume of said coating dispersion which is about 10% greater than the empty volume of the flow channels, so that after completion of the filling cycle said upper face is flooded by the coating dispersion;
   c) removing excess coating dispersion from the upper face of said carrier;
   d) emptying and clearance extraction of the flow channels through an extraction impulse, which is generated by connecting a vacuum tank via an extraction conduit with the bottom face of the catalyst carrier, whereby the time between the beginning of the fill cycle and the end of the emptying and clearance extraction amounts to no more than about 5 seconds, and optionally drying and calcining the coated catalyst carrier after said emptying and clearance extraction of the flow channels.

2. The process according to claim 1, wherein said vacuum tank has an initial partial vacuum of at least about 150 mbar and a volume which amounts to from about 100 to 1000 times the volume of the catalyst carrier.

3. The process according to claim 2, wherein during said clearance extraction, a minimal air flow rate of about 5 m/s is maintained in the flow channels.

4. The process according to claim 3, where in said extraction conduit has a cross sectional area and is equipped with a throttle flap for allowing open flow of said dispersion, the open flow cross sectional area of which can be adjusted from between zero and the total cross sectional area of the extraction conduit.

5. The process according to claim 4, wherein, the time between filling the extraction is short enough that the flow limit of the dispersion cannot develop due to the thixotropic property or intrinsic viscosity of said dispersion.

6. The process according to claim 5, wherein said catalyst carrier is moistened before coating.

7. The process according to claim 5, wherein said catalyst carrier is pre-impregnated with acids, bases or saline solutions before coating.

8. The process according to claim 1, wherein after said emptying and clearance extraction of the flow channels, and before calcining the catalyst carrier, a heated flow of air with a temperature of between about 50 and 80° C. is conducted through the flow channels against the emptying direction with a speed of more than about 2 to 10 m/s for a duration of from about 2 to 60 seconds.

9. A process for coating a honeycomb-form catalyst carrier with a coating dispersion, said carrier having axially aligned flow channels arranged in a grid over its cross sectional area, said carrier having an upper and a bottom face, and said process comprising the steps of:
   a) bringing said carrier in an upright position so as to orient the flow channels vertically;
   b) filling said flow channels through the bottom face with a volume of said coating dispersion which is greater than the empty volume of the flow channels, so that after completion of the filling cycle said upper face is covered by the coating dispersion;
   c) emptying and clearance extraction of the flow channels through an extraction impulse, which is generated by connecting a vacuum tank via an extraction conduit with the bottom face of the catalyst carrier, whereby the time between the beginning of the fill cycle and the end of the emptying and clearance extraction amounts to no more than about 5 seconds, and optionally drying and calcining the coated catalyst carrier after said emptying and clearance extraction of the flow channels.

* * * * *